May 7, 1963   P. S. BUCKLAND   3,088,512
TIRE REPAIR
Filed Aug. 9, 1961

INVENTOR.
PAUL S. BUCKLAND
BY
J. B. Holden
ATTORNEY

३,०८८,५१२
TIRE REPAIR
Paul S. Buckland, Akron, Ohio, assignor to The Goodyear Tire & Rubber Company, Akron, Ohio, a corporation of Ohio
Filed Aug. 9, 1961, Ser. No. 130,342
5 Claims. (Cl. 152—370)

This invention relates to a repaired tire.

In repairing deep cuts, etc. in tires it is customary to make wedge-shaped openings through the tire. In passenger and other thin tires the opening may narrow from the outer surface to the inner surface. In thicker tires, such as truck and bus tires, etc., it is customary to have the opening narrow from each surface toward the approximate center of the tire wall. Old rubber and damaged carcass are both removed. The opening is filled with curable rubber stock and cured.

According to this invention, short, discontinuous, individual lengths of filamentary material are used in the rubber that fills the opening. The wall of the opening may be lined with a thin rubber ply containing such filamentary material and/or rubber containing such filamentary material may be used in the plug that fills the opening. The repair is completed by curing in the usual manner.

The filamentary material may be monofilaments or flock or yarns of nylon, polyester, etc., or cotton cord or wire, etc. These materials may be ⅜-inch to 1 inch long, more or less. For lining the wall of the opening or mixing in the plug that fills the opening, 2 to 20 parts of filamentary material per 100 parts of rubber by weight can be used. The filamentary material may be milled into the rubber or mixed with it in any desirable manner and the compounded stock can be calendered, extruded or processed in any desired manner. When nylon flock is milled into the rubber at an elevated temperature, the individual fibers separate as the nylon becomes "homogenized" in the rubber.

The invention is further described in connection with the accompanying drawings, in which—

Figure 1:
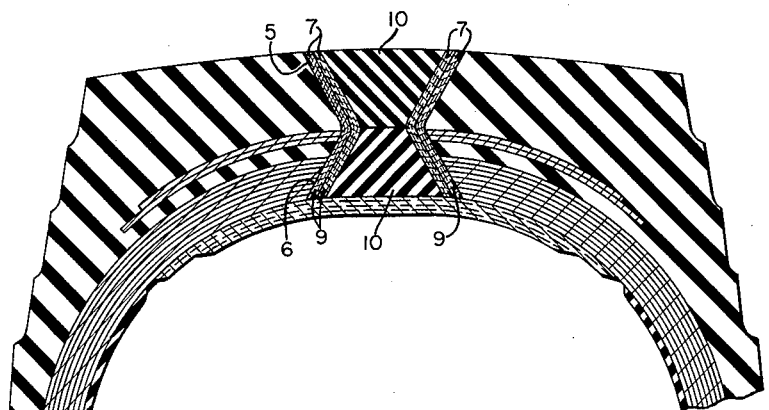
FIGURE 1 is a section through a repair in a thick tire.

In making the repair illustrated in FIGURE 1, the old rubber and carcass are cut away in the usual manner to form the opening which comprises the inwardly tapering outer portion 5 and the outwardly tapering inner portion 6. The opening may be circular, oval or any usual shape.

The cut surfaces are lined with one or more thin sheets 7 of rubber containing short lengths of filamentary material 9. A preferred filamentary material for this use is nylon, preferably ⅜ inch long, or flock nylon. These sheets may be .030 to .060 inch thick, more or less. The walls 5 and 6 of the inner and outer portions may be lined with sheets of differently compounded stocks. Then the lined opening can be filled with the usual repair stock 10, or the inner portions of the opening may be filled with repair stock which contains filamentary material. The filamentary material in the wall lining 7 reduces the abrupt change in rigidity between the tire and the repair stock within it.

When filamentary material, and particularly where short lengths of wires are used in the repair plug located in the opening in a tire where part of the original fabric has been cut away, the filamentary material makes the portion of the plug adjacent the fabric less susceptible to fatigue and less apt to separate from the wall of the opening.

Figure 2:
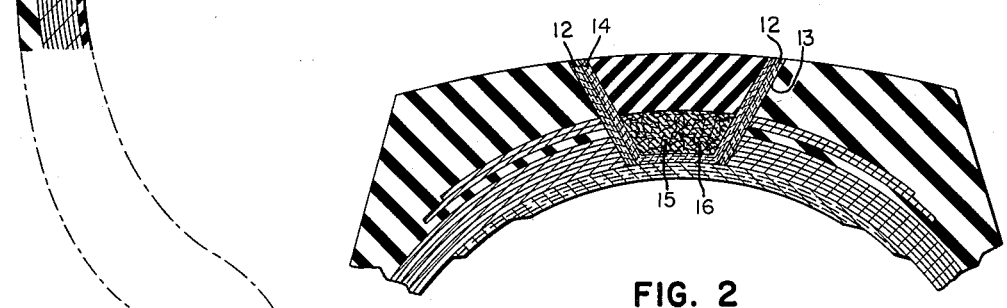
FIGURE 2 is a section through a repair in a thinner tire.

FIGURE 2 illustrates a different repair opening, such as is common in thinner walled tires, in which the opening 12 tapers from the outer surface to the inner surface of the tire. The wall of the opening is covered with two plies 13 and 14 of rubber stock which, for example, contains 5 parts more or less of ⅜ inch (more or less) lengths of approximately 0.006 inch gauge steel wire coated with brass. It is noted that the inner ply 13 forms a continuous web across the opening at the inner surface of the opening. This is optional.

Then the opening is filled with rubber repair stock. This may be any repair stock customarily used for this type of tire or, as shown, the inner half (more or less) 15 of the opening can contain filamentary material 16. This may, for example, be pieces of nylon filament ¾ inch long, and there may be 5 parts by weight per 100 parts of rubber. The filamentary material in the stock which plugs the opening makes the repair, and particularly this portion, less susceptible to fatigue and separation. The outer portion is then filled with a customary repair stock. The repair is vulcanized in the usual manner.

Figure 3:
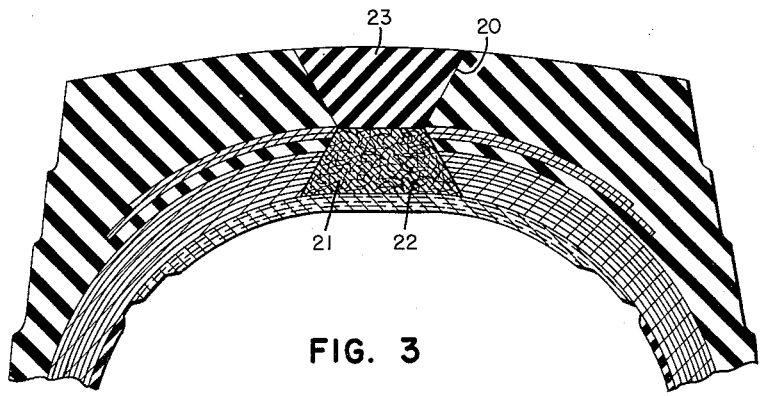
FIGURE 3 is a section through a different type of repair in a thick tire.

FIGURE 3 illustrates a different type of repair in which the wall 20 is not first lined. The stock 21 in the inner portion of the tire contains filamentary material 22, which may be any of the filamentary materials described, and the outer portion 23 of the opening is filled with any customary repair stock. Ordinarily the dividing line between the two stocks 21 (which contains filamentary material) and 23 (which contains no filamentary material) will be approximately the outer surface of the fabric plies. The repair is cured in the usual manner.

The openings are shown as being tapered, because that is the usual present practice. They may be any desired shape. It is also usual to apply one or more plies of patch material over the inner surface of the opening, as shown. The lining of the wall of the opening is optional. It may contain filamentary material, as described, but the use of filamentary material is optional.

The invention is covered in the claims which follow.

What I claim is:

1. A repaired tire which includes rubber stock in an opening through a tire, in which tire the wall of the opening is lined with rubber, and the inner portion of the stock within said lined wall contains short, discontinuous, individual lengths of filamentary material.

2. A tire as claimed in claim 1 in which the rubber lining the wall contains short lengths of filamentary material.

3. A repaired tire which includes rubber stock in an opening through a tire, in which tire the wall of the opening is lined with rubber which includes short, discontinuous, individual lengths of filamentary material.

4. A repaired tire which includes rubber stock in an opening through a tire, in which the inner portion of the stock within the opening contains short, discontinuous, individual lengths of filamentary material and the outer portion contains no filamentary material.

5. The tire of claim 4 in which the dividing line between the different stocks is approximately level with the outer fabric ply in the tire.

References Cited in the file of this patent

UNITED STATES PATENTS

| | | |
|---|---|---|
| 466,169 | Hume | Dec. 29, 1891 |
| 1,000,781 | Collier | Aug. 15, 1911 |
| 2,229,878 | Wilson | Jan. 28, 1941 |
| 2,483,010 | Hooper | Sept. 27, 1949 |
| 2,937,684 | Rockoff | May 24, 1960 |
| 2,960,139 | Engstrom et al. | Nov. 15, 1961 |
| 3,013,599 | Riggs | Dec. 19, 1961 |